July 31, 1951  M. T. CAHENZLI, JR  2,562,294
COUPLER
Filed March 8, 1946
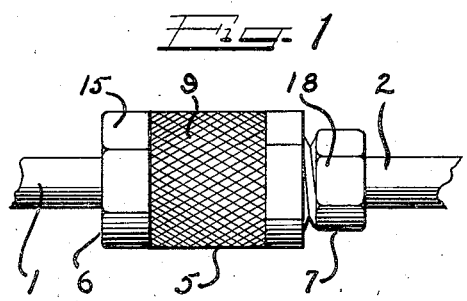
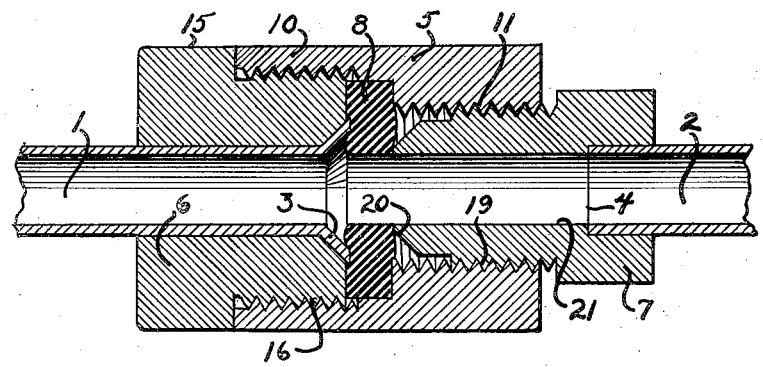
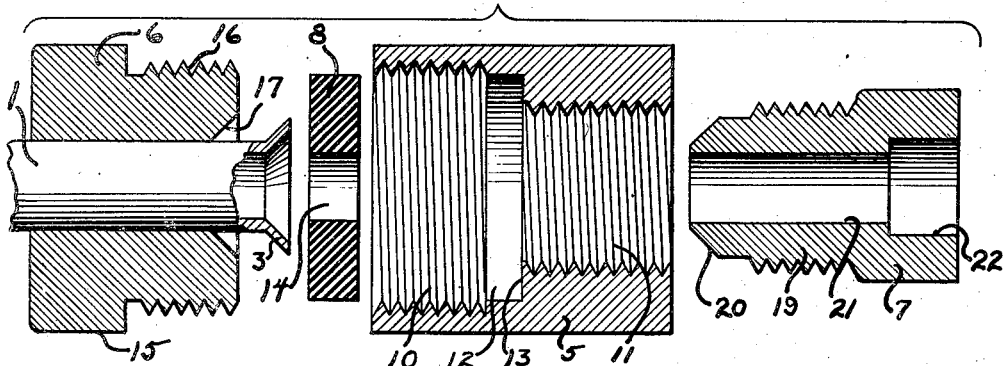
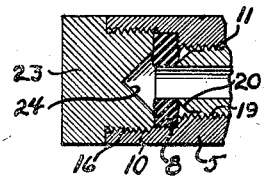
Inventor
MARTIN T. CAHENZLI, JR.

Patented July 31, 1951

2,562,294

UNITED STATES PATENT OFFICE 2,562,294

COUPLER

Martin T. Cahenzli, Jr., Chicago, Ill., assignor to The Harry Alter Company, Chicago, Ill., a corporation of Illinois Application March 8, 1946, Serial No. 652,857

7 Claims. (Cl. 285—157)

This invention relates to improvements in a coupler, and more particularly to a coupling assembly highly desirable for use in the connection of tubes, for the joining of component parts of a fluid line in an effective but expeditious manner, although the invention may have other uses and purposes as will be apparent to one skilled in the art.

In the past, many and various types of coupling assemblies have been developed, some of which were especially designed for use in refrigerating lines, but these formerly known coupling assemblies have proven objectionable for various reasons. In many instances, the assemblies heretofore known included wearing parts which, when worn, could not be replaced and required the substitution of an entirely new coupling assembly. In other instances, the assemblies were too long so that a sharp bend could not be made in the fluid line connected to the assemblies so as to permit installation in tight corners and other locations difficult of access, and further, these formerly known assemblies in most cases required the use of special parts, were objectionably expensive, and frequently required the use of tools for their installation or removal.

With the foregoing in mind, it is an important object of the instant invention to provide a coupling assembly highly desirable for use in refrigeration circuits, and other fluid lines wherein the conduits are sufficiently flexible to be bendable by hand, the assembly being so short as to permit an extremely sharp bend in the fluid conduit and thus permit ready installation of the assembly in substantially any location where there is room enough for the assembly itself.

Another object of this invention is the provision of an extremely economical coupling assembly made up of simple and readily replaceable parts.

A further object of this invention is the provision of a coupling assembly having substantially only one single wearing part which is very easily and readily replaceable, it not being essential to order a special replacement part in the event that wearable part becomes too worn for further usage, but a simple substitute may readily be made.

Another object of this invention resides in the provision of a coupling assembly including means for holding a substantially floating gasket in between parts to be joined in a leak-proof manner, said gasket being directly compressed between the parts being joined.

Another feature of the instant invention resides in the provision of a coupling assembly embodying a simple gasket with means to hold the gasket substantially floating so that it will be compressed between the parts to be joined by the coupling assembly, the gasket being so constructed as to provide a large wearing surface and the gasket may be worn substantially to the limit, that is, until it has materially decreased in thickness.

Still a further feature of the instant invention resides in the provision of a coupling assembly embodying a gasket which is compressed between the parts being joined by the assembly, and which gasket, when too worn to warrant further use, may be simply and readily replaced by punching a suitable substitute gasket from any piece of rubber or the equivalent, such as a piece of innertube, for emergency purposes.

A further object of the instant invention resides in the provision of a coupling assembly which is extremely economical to manufacture, and which does not require the use of tools for its installation or removal, a thoroughly and effective and positive gas or liquid seal being effected by the coupling between the parts being joined by manual manipulation of the coupling elements only.

It is also an object of this invention to provide a coupling assembly which may readily be changed into a dead-end nut and used to seal a portion of a fluid line for various testings, the dead-end nut being extremely easy to secure and remove, and requires the use of no tools for that purpose.

While some of the more salient features, characteristics and advantages of the present invention have been above pointed out, others will become apparent from the following disclosures, taken in conjunction with the accompanying drawings, in which:

Figure 1 is a fragmentary plan view of a coupling assembly embodying principles of the instant invention installed in a fluid line;

Figure 2 is an enlarged central vertical sectional view through the structure of Figure 1;

Figure 3 is an enlarged vertical sectional view of the structure of Figures 1 and 2 showing the parts separated from each other, this figure being in the nature of an exploded view; and Figure 4 is a reduced fragmentary vertical sectional view of the same character as Figure 2, but illustrating the conversion of the coupling assembly into a dead-end nut.

As shown on the drawing:

While the instant invention is highly desirable for use in refrigeration circuits, it will obviously have other and various uses as will be apparent to one skilled in the art. For the purpose of clarity, however, the instant invention may be assumed to be associated with a refrigerating circuit to aid the description.

In the single embodiment of the invention illustrated in the drawing, there is seen a pair of tubes or conduits 1 and 2 which form component parts of the same fluid line, which may be part of a refrigeration circuit. For purposes of illustration, the tube 1 is shown with a flared end 3 and the tube 2 is shown with a straight cut end 4, although either or both the tubes may have their ends straight cut or flared as may be desired. In the event these tubes are part of a refrigerating circuit, they would preferably be made of flexible copper tubing so as to be bendable or otherwise shaped by hand.

The coupling assembly embodied in the instant invention is simple in construction and includes only a total of four parts, namely, a body sleeve 5, a fitting 6, a fitting 7, and an internal gasket 8. With the exception of the gasket 8 which is preferably of rubber or equivalent resilient material, these parts are simple and economical screw machine parts. Any part is readily replaceable in the event of injury, but there is little wearing surface on any of the parts with the exception of the gasket and so the entire assembly is extremely long lived.

With reference to Figure 1, it will be seen that the body sleeve 5 is preferably knurled or otherwise roughened on its external surface as indicated at 9 to afford a grip to the hand of an operator. With reference more particularly to Figure 3, it will be seen that in the illustrated instance this body sleeve 5 is in the form of an adaptor sleeve, that is, it has an internally threaded portion 10 at one end and an internally threaded portion 11 at the other end of less diameter than the portion 10. Between these threaded portions 10 and 11 a gasket seat is provided, this seat preferably including a smooth annular portion 12 and a smooth shoulder 13 extending radially inwardly. As seen best in Figure 2, the gasket seat is preferably of less depth than the thickness of the gasket 8 so ample take-up room is provided as the gasket wears.

The gasket 8 is of a washer type, that is, it has form of a right cylinder with a central aperture 14. The aperture 14 is of less size than either of the threaded portions 10 and 11 of the body sleeve 5, so that there is ample space on each side of the gasket for abutment by the parts to be joined. In other words, the gasket provides a large wearing surface on each side. As stated above, the gasket is preferably thicker than the depth of the gasket seat so that it projects beyond the seat on the open side as seen in Figure 2, and thus as the gasket wears down there is room for a shifting of the gasket or a further compression of the gasket into the seat as the case may be. This particular form of gasket may readily and economically be provided by merely slicing transversely a relatively thick-walled rubber tube. In an emergency, such a gasket may be easily cut out of any handy piece of rubber or equivalent resilient material, such as a piece of old inner tube, and that emergency gasket will effectively function until a new gasket may be obtained. The gasket may wear down well below half of its original thickness and still function positively and efficiently.

The fitting 6 is preferably provided with a head 15 of exterior polygonal shape to facilitate the use of a tool, if the same is desired. Extending from this head portion is an externally threaded part 16 for engagement with the threaded portion 10 of the body sleeve 5. The fitting has a central bore of a size to accommodate the aforesaid tube or conduit 1, and this bore is reamed out or counter-sunk as indicated at 17 to accommodate the flare 3 on the end of the tube. As indicated in Figure 3, the fitting 6 is slidable along the tube 1, and should the flare 3 become worn, it is a simple expedient to cut off the end of the tube 1 and with a suitable tool provide a new flare, without disconnecting the fitting from the tube.

The fitting 7 is provided with a head portion having one or more flat spots 18 (Figure 1) thereon to enable the use of a tool if the same is desired. Projecting from the head portion is an externally threaded part 19 to fit the internal portion 11 of the body sleeve 5. This part 19 terminates in a smooth beveled nose 20 which insures positive engagement with the gasket 8. The fitting is provided with a central bore 21, preferably of substantially the same size as the aperture through the gasket 8, and at the outer end of the fitting an open recess 22 is provided for the reception of the end of the tube or conduit 2 which may be secured to the fitting in any suitable manner such as by soldering, brazing or the like.

Customarily, in refrigeration circuits, one of the fittings would be substantially permanently secured to its respective tube portion, as in the illustrated instance, the fitting 7 is soldered, brazed or otherwise secured to the tube portion 2. Consequently, in that event, the coupling assembly may be considered as comprising only three pieces, namely, a body sleeve, another fitting, and a gasket.

It will be understood that all threaded connections may be standard or may be pipe threads, as desired by the particular user. Further, the thread arrangement is so constructed that the coupling assembly may be tightened solely by hand operation and provide an effective and leak-proof connection.

In use, it is a simple matter to install the coupling. The preferable manner of installing the coupling is to first connect the fitting 6 with the body sleeve 5 and with the gasket 8 in position, substantially as viewed in Figure 2. This assembly of the fitting and body sleeve will then rotate freely about the tube 1, and the assembly may be used as a unit and threadedly engaged with the fitting 7 until the nose on that fitting presses into the gasket 8. Thus, an effective and fluid-tight seal may be made readily by hand without the use of any tools. Usually, after the assembly is tightened on the fitting 7, rotative movement of the fitting 6 relatively to the pipe or conduit 1 will be restrained by virtue of the flare 3 pressing into the gasket 8, but the connection will be fluid-tight whether or not some rotative movement between the conduit 1 and the fitting 6 still is available. The only real need for ever separating the fitting 6 from the body sleeve 5 is to permit the replacement of the gasket 8.

In the event conditions are crowded and for some reason there should be insufficient room to manipulate the assembly including both the fitting 6 and body sleeve 5, the coupling may be assembled by first threadedly engaging the sleeve 5 upon the portion 19 of the fitting 7, either before or after the gasket 8 has been placed in the seat 12—13. The gasket substantially floats in the seat between the threaded portions 10 and 11 of the body sleeve, and may move or be distorted in either direction when the gasket is compressed between the confronting parts held by the body sleeve. The fitting 6 is then threaded or screwed into the body sleeve 5, it being noted that this fitting rotates relatively to the tube 1 extending therethrough. This fitting is tightened in place until the inner end abuts and presses against the gasket 8, and from the showing in Figure 2, it will be apparent that at that time the slightly protruding portion of the flare 3 is more or less embedded into the gasket. The nose 20 on the aforesaid fitting 7 also presses into the gasket as indicated in Figure 2 and there is a positive leak-proof connection between the tubes 1 and 2. As is obvious from the showing in Figure 2, the gasket may wear down well below half its original thickness and still that same positive leak-proof connection will be established.

In order to loosen the coupling, it is a simple expedient to unscrew the assembly of the fitting 6 and body sleeve 5 from the part 19 of the fitting 7, or if so desired, the fitting 6 may be unscrewed from the sleeve 5 and the sleeve left attached to the fitting 7. All manipulation of the coupling assembly may be accomplished only by hand, although tools may be used if desired. It will also be noted that the entire coupling assembly is very short in linear length, and it is a simple proposition to make a sharp bend in either of the tubes 1 or 2 immediately adjacent the fitting so that the fitting may be crowded into very cramped quarters and yet easily installed by an operator.

In Figure 4, I have illustrated how the coupling assembly may be readily converted into a dead-end nut. In this arrangement, a fitting 23 is substituted for the fitting 6, this fitting having an indentation in its inner end as indicated at 24. Otherwise, the fitting is substantially the same as the fitting 6 but does not have any aperture therethrough. Accordingly, when this fitting 23 is utilized with the body sleeve 5 as an assembled unit, there is provided a very simple and easily used dead-end nut which will seal fluid-tight without the use of a wrench or any other tool.

From the foregoing, it is apparent that I have provided an extremely simple, economical, and highly efficient coupling assembly comprising very few parts, and substantially only one single part subject to wear, which part may be readily and economically replaced, or in an emergency, a substitute part may be made by hand from available material and used in lieu of the worn part. The entire coupling with the sole exception of the gasket, embodies economical screw machine parts of extremely long life, and the assembly may be installed with facility in locations difficult of access.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a coupling, a sleeve forming the coupling body and being internally threaded at each end, said sleeve having a smooth recess therein between the threaded end portions, a resilient gasket of the form of a right cylinder seated in said recess, and a threaded fitting engageable in each end of said sleeve in a manner to directly compress said gasket between the inner ends of said fittings.

2. In a coupling assembly, a sleeve internally threaded at each end, a threaded fitting for each end of said sleeve, and a washer-like gasket in said sleeve in position to be compressed axially of the assembly by the inner ends of said fittings.

3. In a coupling assembly, a body sleeve internally threaded at each end but of different diameters, a gasket seat between the threaded portions, a washer type gasket in said seat, a fitting engageable in one end of said sleeve, a fitting engageable in the other end of said sleeve, a flared fluid tube connected to one of said fittings, and the threaded portions of said sleeve being so arranged that said gasket is compressed between the inner ends of said fittings with the terminal edge of the flared end of said tube pressed into the side of the gasket.

4. In a coupling assembly, a body sleeve internally threaded at each end but of different diameters, a gasket seat between the threaded portions, a washer type gasket in said seat, a fitting engageable in one end of said sleeve, a fitting engageable in the other end of said sleeve, a flared fluid tube connected to one of said fittings, and the threaded portions of said sleeve being so arranged that said gasket is compressed between the inner ends of said fittings with the terminal edge of the flared end of said tube pressed into the side of the gasket, the exterior of said sleeve being roughened, and said gasket being sufficiently resilient to permit a tight connection being made manually.

5. In a coupling, a body sleeve internally threaded at one end and having means at the other end for connection to a part of a fluid line, said sleeve being interiorly shaped to support a gasket transversely of the sleeve, an apertured gasket in said sleeve, and a fitting having a threaded end for engagement in the threaded end of said sleeve to abut said gasket, said fitting being shaped to accommodate a flared end tube therein, and said sleeve and fitting being rotatable as a unit relatively to a tube in the fitting when joined together.

6. In a coupling assembly, a sleeve internally threaded at each end but having different diameters, said sleeve having a gasket seat therein between the threaded ends and defined by longitudinal and radial walls, a washer-like gasket in said seat, and a threaded fitting for each end of said sleeve enterable sufficiently to compress said gasket between the inner ends of said fittings and for one fitting to also force said gasket firmly into said seat.

7. In a coupling assembly, a sleeve internally threaded at each end but having different diameters, said sleeve having a gasket seat therein between the threaded ends and defined by longitudinal and radial walls, a washer-like gasket in said seat, and a threaded fitting for each end of said sleeve enterable sufficiently to compress said gasket between the inner ends of said fittings and for one fitting to also force said gasket firmly into said seat, one of said fittings being in the form of a solid plug.

MARTIN T. CAHENZLI, Jr.

(References on following page)

REFERENCES CITED

The following references are of record in the file of this patent:

UNITED STATES PATENTS

| Number | Name | Date |
|---|---|---|
| 751,259 | Chaffey | Feb. 2, 1904 |
| 804,149 | Meyer | Nov. 7, 1905 |
| 906,225 | Harrison | Dec. 8, 1908 |
| 1,138,946 | Elliott | May 11, 1915 |
| 1,796,077 | Boosey | Mar. 10, 1931 |
| 1,800,753 | Replogle | Apr. 14, 1931 |
| 2,313,323 | Cowles | Mar. 9, 1943 |
| 2,362,686 | De Lano | Nov. 14, 1944 |
| 2,381,829 | Livers | Aug. 7, 1945 |
| 2,416,829 | Hartley | Mar. 4, 1947 |
| 2,466,521 | Weatherhead | Apr. 5, 1949 |

FOREIGN PATENTS

| Number | Country | Date |
|---|---|---|
| 328,270 | Italy | Aug. 3, 1935 |